UNITED STATES PATENT OFFICE.

JOSEPH LE ROY WEBBER, OF DETROIT, MICHIGAN.

PEPSIN.

SPECIFICATION forming part of Letters Patent No. 454,575, dated June 23, 1891.

Application filed March 20, 1891. Serial No. 385,739. (No specimens.)

*To all whom it may concern:*

Be it known that I, JOSEPH LE ROY WEBBER, a citizen of the United States, residing at Detroit, in the county of Wayne and State of Michigan, have invented a new and useful Improvement in Pepsin, of which the following is a specification.

The object of my invention is to provide a new and improved article of pepsin which shall be free from peptone, and consequently non-hygroscopic, inodorous, devoid of objectionable tastes, permanent, and of a pearl-whitish appearance, thus essentially differing from the entire class of peptone pepsins, which are of a yellowish color and contain a large proportion of peptone, which lends to such pepsins a hygroscopic and putrescible character.

It is furthermore my object to produce a pepsin which may be readily distinguished from all other precipitated pepsins heretofore made by its ready and almost complete solubility in water and in acidulated water, owing to its comparative freedom from mucus, of which considerable is present in the precipitated pepsins, which shall be further distinguishable from the precipitated pepsins by being practically free from the precipitant or substance used to effect precipitation, and which by reason of the absence, practically and comparatively speaking, of inert contaminations—such as mucus and foreign salts or substances—shall be of much greater digestive power than other pepsins, as is shown by actual comparative tests.

To produce my improved article of manufacture on a commercial scale I proceed as follows: The mucous membranes of pigs' stomachs, from which the yield is to be obtained, are digested with weak hydrochloric acid or acidulated water, at from about 40° centigrade to 50° centigrade, until they undergo self-digestion, and solution thereof is effected. I then add sulphurous acid in sufficient quantity to preserve the solution from decomposition and allow the liquid to clarify itself by precipitation of mucus, without causing any material injury to the ferment from putrefactive changes. The comparatively clear liquid is next drawn off and then saturated with sodium sulphate, which may be in the form of "salt-cake" or Glauber's salt, the temperature of the liquid to be maintained, preferably, at about 34° centigrade until complete or substantially complete separation of the pepsin results by precipitation. The pepsin precipitate thus obtained when collected, pressed, and dried constitutes the first or "crude" product, which, however, is marketable, being very active and meeting certain requirements of trade. To purify this first product it is dissolved, preferably, while yet moist, in weak hydrochloric acid, and the solution is subjected to dialysis until the sodium sulphate is sufficiently removed. The liquid is then subjected to concentration, which may be performed *in vacuo* or in the open air, and the concentrate is dried on plates of glass or by other suitable means, preferably with the addition of a minute quantity of gum-tragacanth to facilitate the sealing of the pepsin on glass. By then allowing the solution from which the pepsin precipitate has been removed and which contains the sodium sulphate and practically all of the peptone to cool gradually the sodium sulphate will crystallize out, leaving the peptone in solution. Thus about ninety per cent. of the salt may be recovered for subsequent use, and at the same time the peptone is speedily and economically removed.

The result of the foregoing proceeding is pepsin practically free from offensive odor and from peptone and hygroscopic character.

As an article of manufacture, my improved product is readily distinguishable, owing to its peculiar characteristics, from all other pepsins on the market, and particularly so from the pepsin manufactured in accordance with Letters Patent of the United States No. 424,357, of March 25, 1890, which is essentially the result of partially separating by dialysis the inert and highly hygroscopic peptone from the macerate of pigs' stomachs, while my improved product is the result of separating the peptone, practically completely, from the pepsin by precipitation of the latter, and subsequently purifying the precipitated pepsin by removing by dialysis, the sodium sulphate with which it is contaminated.

My improved product is readily distinguishable from that manufactured according to the aforesaid patent by a quantative estimate of the peptone contained in each and by the readiness with which the aforesaid old product is reduced to a cohesive mass when exposed to the atmosphere, while my product is permanent under the same conditions, Furthermore, my pepsin is three times more active than the old product referred to, the digestive strength of which can not be made to equal that of mine by prolonged dialysis without such a loss of the ferment, resulting in such a small yield as to render impracticable its production on a commercial basis.

What I claim as new, and desire to secure by Letters Patent, is—

As a new and improved article, the herein-described pepsin, free from precipitants or inert dividing agents and from peptones and mucus, and thus non-hygroscopic, inodorous, substantially permanent, of a pearl-whitish appearance, and readily soluble in water.

JOSEPH LE ROY WEBBER.

In presence of—
D. GERMAIN,
FRED C. HARVEY.